United States Patent

Shattuck

[15] 3,692,321

[45] Sept. 19, 1972

[54] PNEUMATIC TOOL HOLDER

[72] Inventor: Chauncey H. Shattuck, Gresham, Oreg.

[73] Assignee: Richard L. Alexander, Gresham, Oreg. ; a part interest

[22] Filed: April 26, 1971

[21] Appl. No.: 137,559

[52] U.S. Cl. ........................................279/4, 279/60
[51] Int. Cl. ..............................................B23b 31/30
[58] Field of Search.............................279/1 H, 4, 60

[56] References Cited

UNITED STATES PATENTS 3,647,231    3/1972    Schafer..........................279/4

Primary Examiner—Francis S. Husar
Attorney—Eugene D. Farley

[57] ABSTRACT

A pneumatic tool holder comprises a hollow, cylindrical case having a tapered, open nose. Mounted within the case are a hollow finger guide having radially spaced longitudinal guide slots receiving a plurality of grip fingers, and a piston to which the fingers are connected. A sleeve mounted for free rotation on the case connects to a compressed air source and communicates through a port with the interior of the case, behind the piston. Compressed air introduced into the case drives the piston in a first direction. Spring means mounted within the case drive the piston in the reverse direction. This alternately advances and retracts the fingers into tool-gripping and tool-releasing positions, respectively.

5 Claims, 6 Drawing Figures

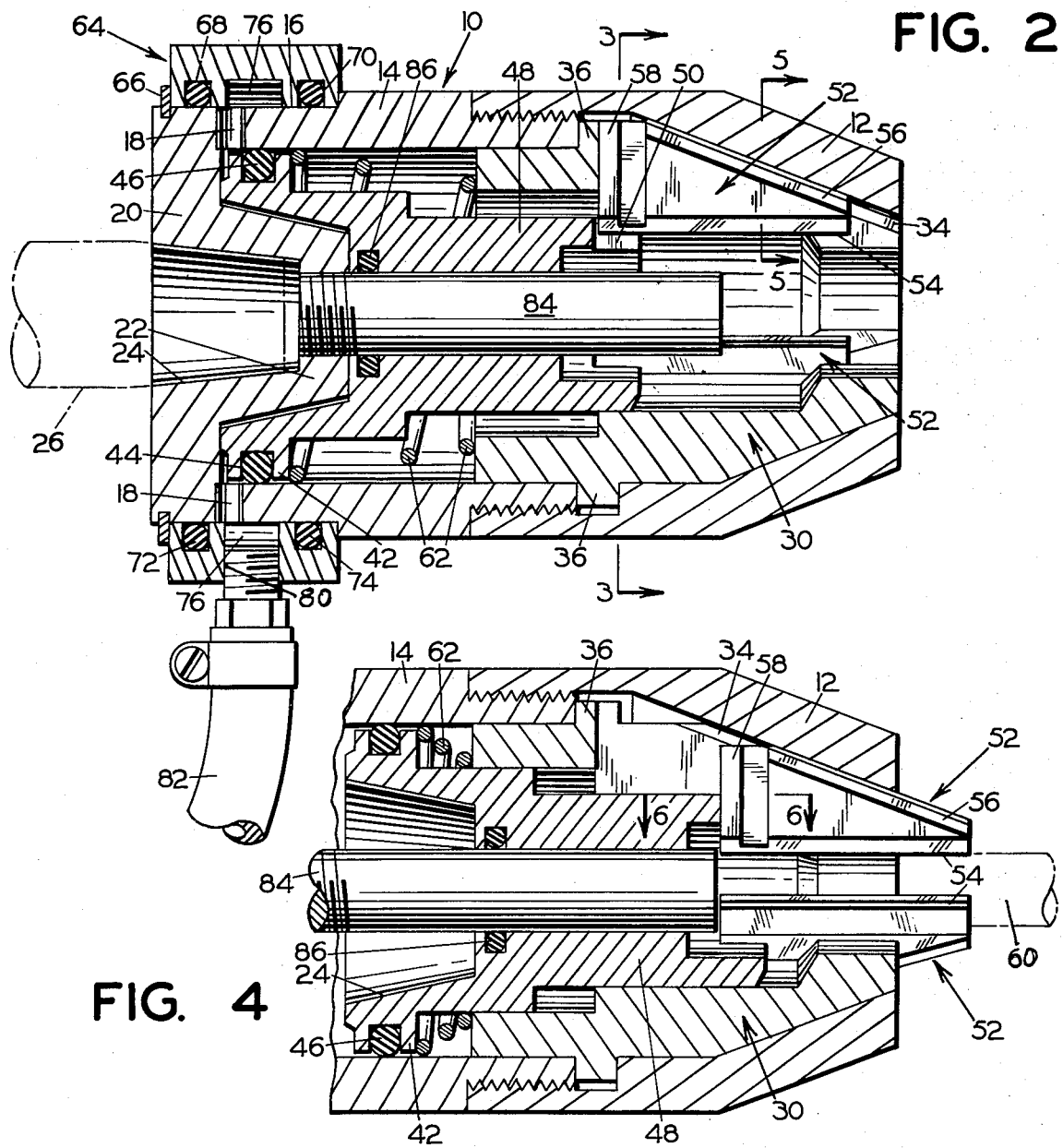
FIG. 2
FIG. 4
FIG. 5
FIG. 6
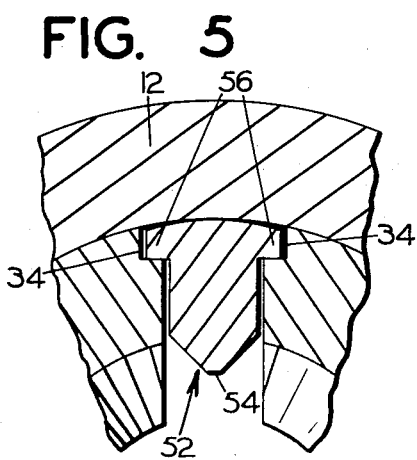
CHAUNCEY H. SHATTUCK
INVENTOR.
BY Eugene P. Farley
ATTY.

PNEUMATIC TOOL HOLDER

This invention relates to pneumatic tool holders including lathe chucks, drill holders, milling machine tool holders, etc.

It is the general purpose of the present invention to provide a pneumatic tool holder such as an air chuck, drill holder, or milling machine tool holder in which the tool or work is mounted rapidly, which holds the tool or work securely, and which follows the tool if the latter is worn.

It is a further purpose of the invention to provide a pneumatic tool holder of the class described which may be operated with the air hose attached, which is easy to adjust to the tool size, which is no larger than an ordinary key-o perated chuck, and which relieves the operator of the necessity of working with an awkward key having the further disadvantage of being easily lost.

The pneumatic tool holder which accomplishes the foregoing and other purposes broadly comprises a hollow cylindrical case having a tapered nose open at the end and a shank end provided with a transverse port. Means are present for attaching the rearward end of the case to a rotary drive shaft. A hollow finger guide and a hollow piston are mounted in nesting relation within the case. A plurality of grip fingers are slidably mounted in the finger guide and releasably secured to the piston.

A sleeve mounted for free rotation on the shank end of the case has a fitting for connection to a source of air under pressure, and a passageway communicating with the port in the case. Air under pressure introduced into the case through the port drives the piston in a first direction. Spring means bearing on the piston drive it in the reverse direction. It thus is possible to advance and retract the fingers connected to the piston as required alternately to secure and release a tool.

Considering the foregoing in greater detail, and in connection with the drawings wherein:

FIG. 2 is a longitudinal section of the tool holder with the tool holding fingers retracted;

FIG. 3 is a transverse section taken along line 3—3 of FIG. 2;

FIG. 4 is a fragmentary longitudinal section similar to FIG. 2 but illustrating the tool holder with its tool holding fingers extended in a tool gripping position;

FIG. 5 is a fragmentary detail view in section taken along line 5—5 of FIG. 2 and illustrating the manner of mounting the tool gripping fingers; and FIG. 6 is a fragmentary detail view taken along line 6—6 of FIG. 4 and illustrating the manner of connecting the tool holding fingers to the piston.

Figure 1:
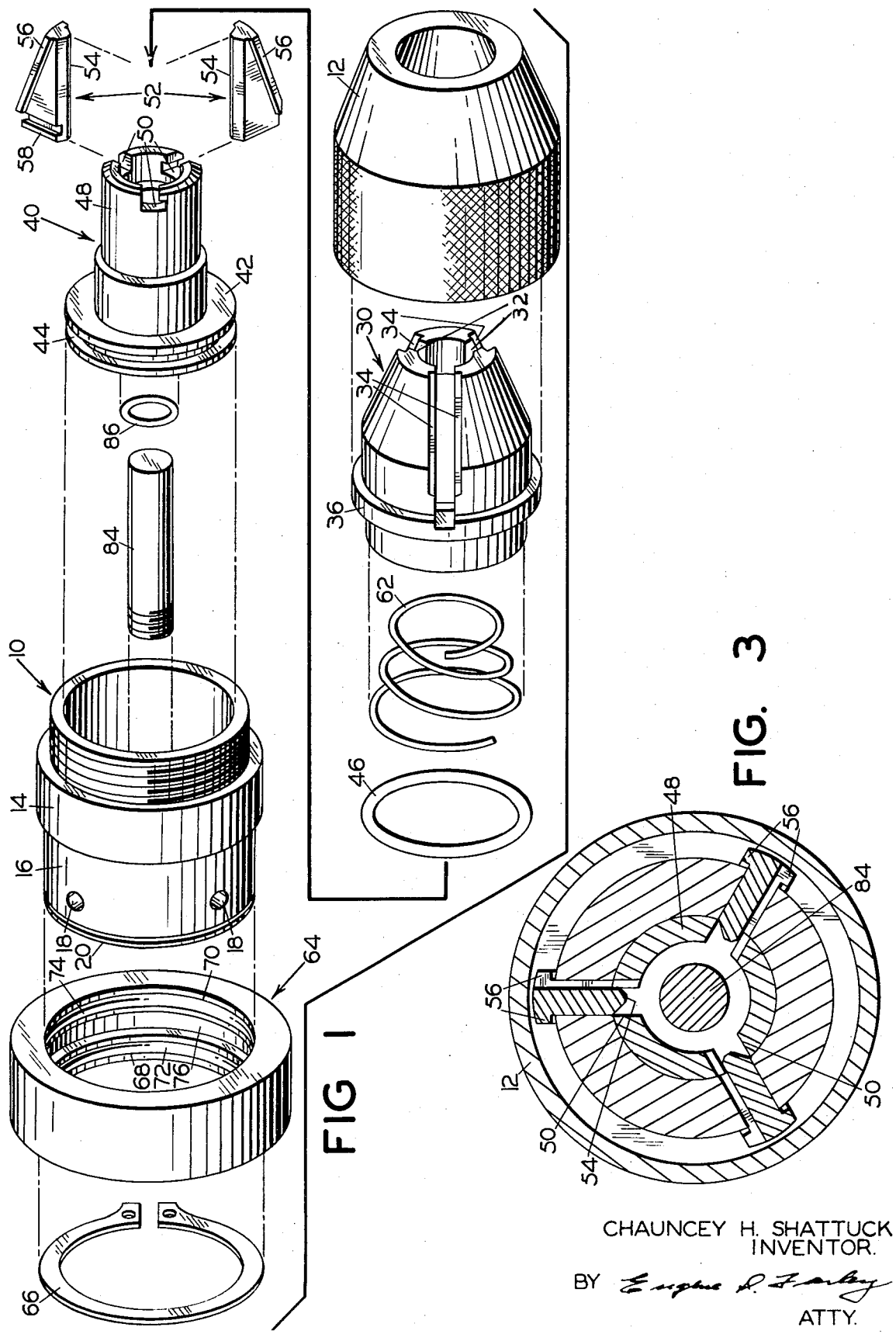
FIG. 1 is an exploded view of the herein described pneumatic tool holder.

The herein described pneumatic tool holder is contained with a hollow cylindrical case illustrated generally at 10. The case is open at both ends and preferably is formed in two parts: a tapered nose section 12 and a cylindrical shank section 14. These are releasably connected by being threaded together, as illustrated particularly in FIGS. 2 and 4.

Shank section 14 has a terminal section 16 of reduced diameter communicating with a plurality of radial ports 18. It also is provided with a cap 20 having an inwardly extending boss 22. The latter has an axial tapered opening 24 dimensioned to receive a taper pin 26, by means of which the tool holder frictionally and releasably is attached to a rotary drive.

A hollow finger guide, indicated generally at 30 of FIG. 1, is seated in nose portion 12 of the case. The finger guide has a nose portion which has a taper matching the taper of the interior surface of nose portion 12 of the case. It is formed with a plurality of radially-spaced, longitudinal slots 32 having recessed side margins 34. An integral, annular rib 36 is present on the shank end of the guide, near its rearward end.

A hollow piston 40 is received within finger guide 30. The piston has a head 42 having an annular groove 44 dimensioned to accommodate a seal ring 46. The piston also has a stepped extension 48, the end of which is provided with radially spaced retainer grooves 50.

A plurality of fingers 52 are received in guide slots 32 of finger guide 30 and secured to piston 40. As again shown particularly in FIG. 1, the fingers comprise elements of triangular contour having wedge-shaped gripping edges 54 on one side and a pair of laterally-extending, marginal ribs 56 on the other side. The fingers are dimensioned for reception in slots 32 with ribs 56 being received in marginal recesses 34 of the latter.

Fingers 52 are connected to piston 40 by means of integral tongues 58. These are dimensioned to be received in retainer grooves 50 of piston 40. The assembly thus provides a collet for holding the tool or work by means of fingers 52.

Means are present for advancing and retracting the collet assembly as required alternately to secure and release a tool 60. This is accomplished by reciprocating piston 40 between its retracted position of FIG. 2 and its advanced position of FIG. 4. In the retracted position of FIG. 2, the fingers are separated ready to receive tool 60. In the advanced position of FIG. 4, the fingers are extended and grip the tool in the usual manner.

The piston is driven in a first direction by means of a coil spring 62 which is mounted on stepped extension 48 of the piston.

The piston is driven in the reverse direction by compressed air supplied through a rotary sleeve or gland indicated generally at 64. This sleeve is mounted for free rotation on the portion of reduced diameter 16 of case shank section 10. One of its margins abuts the shoulder defining this section; the other is retained releasably by means of a C-clip 66 received in a groove at the end of the case.

The interior surface of sleeve 64 is provided with three annular recesses, FIG. 2. Two of these, recesses 68, 70, receive seal rings 72, 74. An intermediate recess 76, provides an air passageway communicating with ports 18 through the shank end of the case.

A threaded port 80 extends transversely through sleeve 64. It affords a means of connection with an air hose 82 which supplies air under pressure to the tool holder.

Combination piston guide and tool stop means are also included in the assembly.

To this end, boss 22 of cap piece 20 is threaded and receives the threaded end of a post 84. The post in turn penetrates the hollow interior of piston 40. 0-ring 86 provides a seal.

Post 84 guides the piston as it reciprocates within the case. It also acts as a stop against which fingers 52 abut in their retracted position, as seen particularly in FIG. 4.

The operation of the tool holder is as follows:

Spring 62 normally maintains piston 40 with attached fingers 52 in their retracted, open position. In this position tool 60 may readily be inserted. Air then is applied via air hose 82, passageway 80, sleeve 64, and ports 18 in case part 14. This introduces the air behind the head 42 of piston 40, advancing the piston.

As the piston advances, it contemporaneously advances fingers 52 along the sloping inner side walls of tapered nose cone 12 of the case. This projects the fingers. It also moves them radially towards each other into their gripping position. In the latter position, the fingers hold tool 60 securely and continuously as it is applied to the work. When it is desired to change tools, shutting off the air supply permits spring 62 to retract the piston and gripping fingers, thereby opening the tool holder so that the old tool may be removed and a new one inserted.

Having thus described my invention in preferred embodiments, I claim as new and desire to protect by Letters Patent:

1. A pneumatic tool holder comprising:
   a. a hollow case having a tapered nose open at the end and a shank end provided with a transverse port communicating with the interior of the case;
   b. attaching means for attaching the rearward end of the case to a rotary drive shaft,
   c. a hollow finger guide having radially spaced longitudinal guide slots, mounted in the case, with the guide slots communicating with the open end of the tapered nose of the case;
   d. a plurality of grip fingers slidably mounted in the slots and guided between positions of tool gripping and tool Please by release interior surface of the tapered nose of the case;
   e. a piston mounted in the case within the hollow guide;
   f. connecting means releasably connecting the inner end of the fingers to the piston;
   g. spring means bearing against the piston and driving it in a first direction; and
   h. a sleeve mounted for rotation on the shank end of the case,
   i. the sleeve having connecting means for connecting it to a source of air under pressure, and a passageway communicating with the transverse port in the case,
   k. the port being positioned relative to the piston to supply air under pressure thereto to drive it in a direction the reverse of that in which it is driven by the spring means.

2. The tool holder of claim 1 wherein the spring means is arranged to drive the piston in the direction of tool release, and the port is positioned to supply air to the piston as required to drive it in the direction of tool gripping.

3. The tool holder of claim 1 wherein the piston is hollow and including an axially arranged post mounted centrally of the shank end of the case and extending forwardly into the nose to provide an abutment stop for the fingers in their position of tool release.

4. The tool holder of claim 1 wherein the connecting means releasably connecting the inner ends of the fingers to the piston comprise tongue and groove connecting means.

5. The tool holder of claim 1 wherein the fingers are provided with longitudinal ribs along their side margins and wherein the guide slots of the finger guide are provided with longitudinal recesses dimensioned to receive the ribs.

* * * * *